United States Patent Office 3,511,085
Patented May 12, 1970

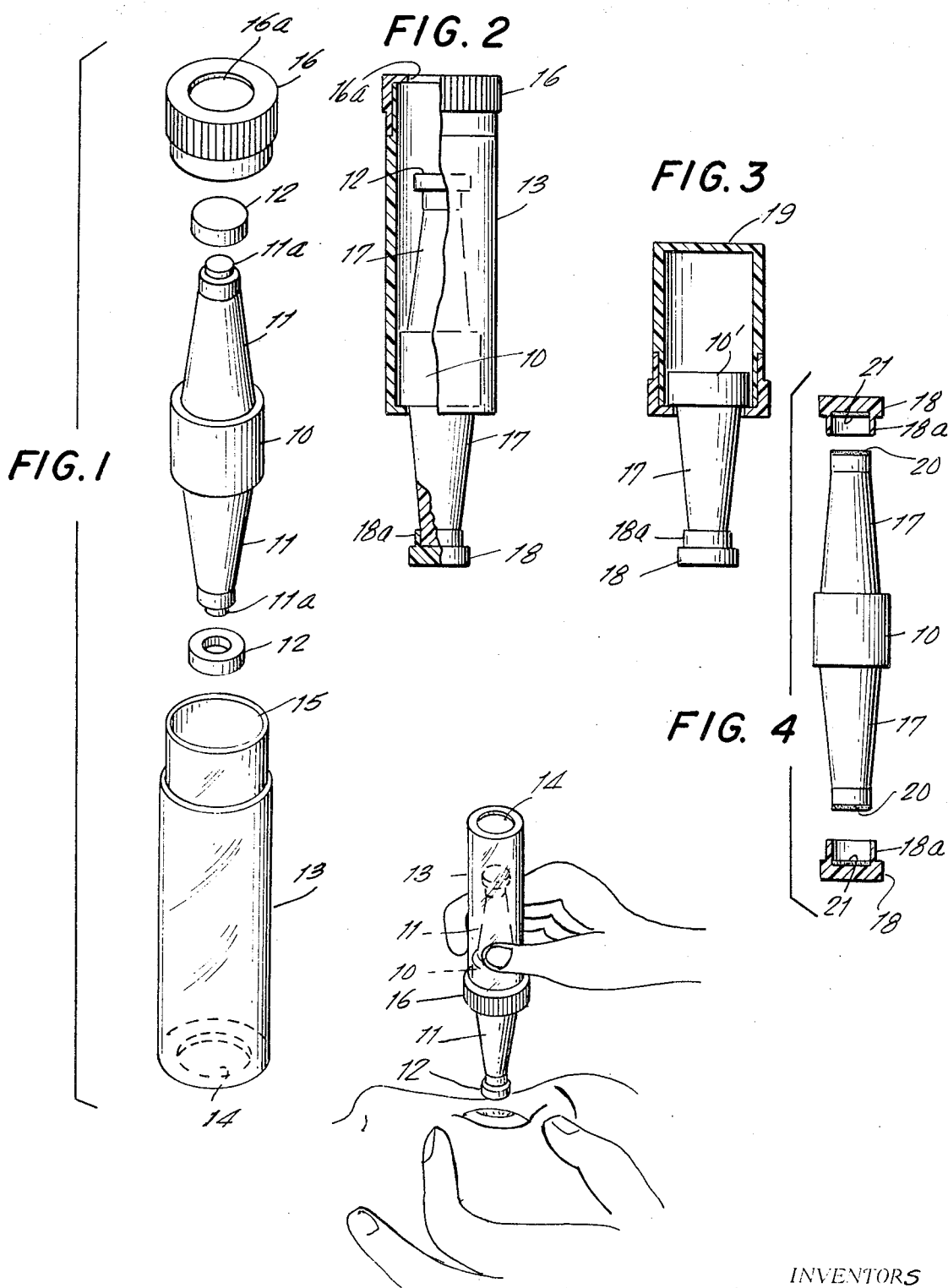

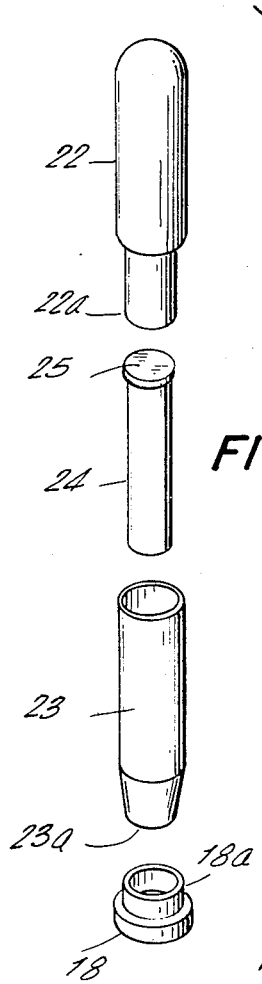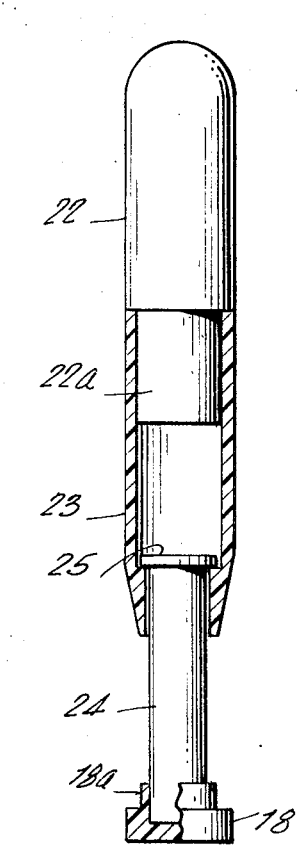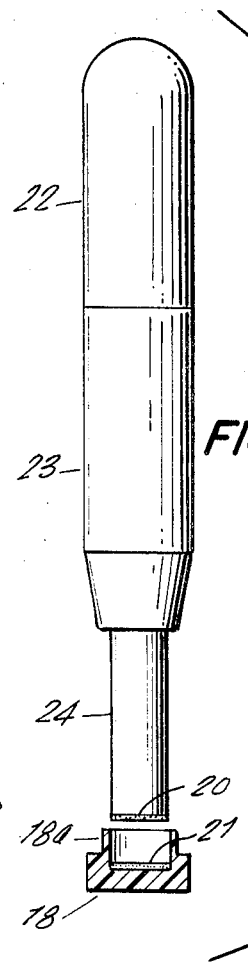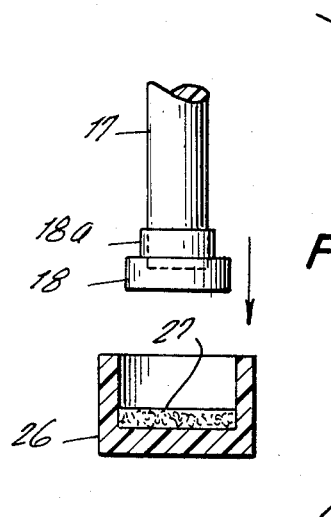

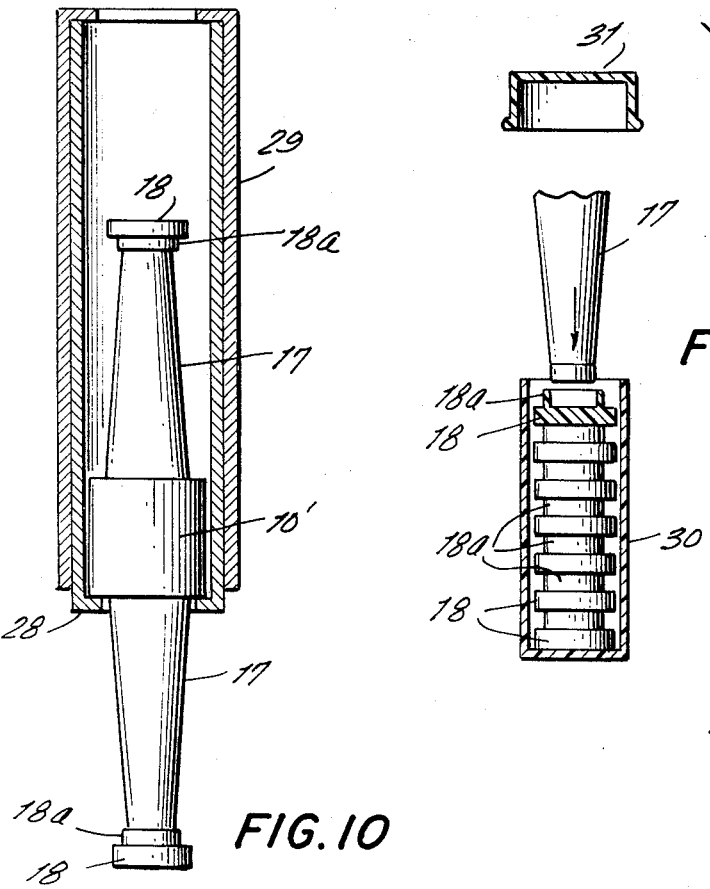
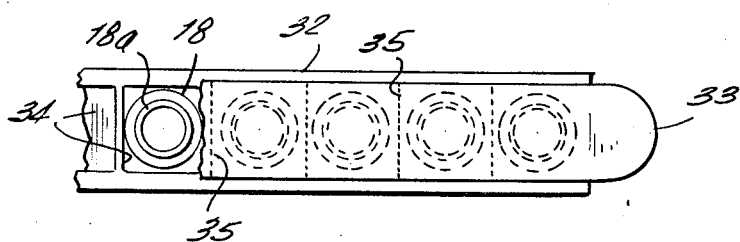

3,511,085
DISPOSABLE TIP APPLANATION TONOMETER
Adolph Posner, New York, and Richard Inglima, Brooklyn, N.Y., assignors to I.G.R. Corporation, New York, N.Y., a corporation of New York
Filed Feb. 3, 1967, Ser. No. 613,829
Int. Cl. A61b 9/00
U.S. Cl. 73—80                5 Claims

ABSTRACT OF THE DISCLOSURE

A single or double ended tonometer is constructed which comprises a hub portion and at least one axially aligned shaft extending from the end portion and having a tapered end, a removable and disposable end plate which is constructed to fit over the tapered end portion of each at least one shaft, said hub portion, said at least one shaft and associated end plate being of fixed, known weight. Said tonometer received within a cylindrical container.

---

The present invention relates to the art of tonometry and more particularly is concerned with a simple inexpensive disposable tonometer useful for ophthalmologists and particularly suitable for use in mass glaucoma testing and screening programs to provide a simple and effective tonometer which may be used by skilled and unskilled persons alike. The present application embodies improvements over those disposable tonometers described in our copending applications Ser. No. 453,604 filed May 6, 1965 now abandoned and Ser. No. 554,861 filed June 2, 1966, now abandoned.

Each of these applications describes disposable applanation tonometers as well as the techniques involved in using them. For example, FIG. 1 in our application Ser. No. 453,604 discloses one method of packaging a disposable tonometer. FIGS. 2, 4, 5, 6 and 7 in our application Ser. No. 554,861 show a cup with a pad containing the stain which may be used in connection with the measurement of intraocular pressure, a sample image reproduced from the impression made by the eye on the end plate of the stained tonometer, and sample scales for determining intraocular pressure.

The disposable applanation tonometer of the present invention is superior to those disclosed in our above mentioned copending applications in that the shafts are tapered to facilitate handling and accuracy of use and in addition to being able to dispose of the entire tonometer because of its inexpensive cost, it is possible to merely discard the end plate which comes in contact with the eye. The present tonometer can be made in a more elegant form if desired for permanent usage together with a multiplicity of replaceable, disposable end plates. The tonometer of the present invention may be either single or double ended and because of the easy removability, discardability and replaceability of the end plates which come into contact with the eyes it is equally facile to use a single or double ended tonometer.

When the end plates have been discarded, the tonometer body and container can be sterilized at any suitably convenient time. In another embodiment, the container can be discarded rather than sterilized and a fresh one used. However, the use of freshly sterilized end plates permit a single tonometer to be repeatedly used without any danger of infection because each eye will come in contact with a fresh, clean end plate. After the measurement and recordation procedures are completed the end plate is discarded. It is to be appreciated that the construction and the material used in the construction of tonometers involves some problems if the tonometer is to be sterilized. This means that the material must be capable of withstanding very high temperatures and withstanding the conditions attendant with sterilization procedures. This tends to make the cost of the materials involved substantially high and therefore such tonometers are not so advantageous for mass tests and/or use in so-called underdeveloped countries. These problems are obviated by the present invention which provides a structure whereby only the end plates are disposable and the instrument can be used with a minimum of sterilization by utilizing fresh, clean, sterilized end plates for each person of whom the tonometer is used.

The preferred embodiments of the tonometer of the present application are illustrated in the accompanying drawings in which:

FIG. 1 is an enlarged, exploded view of one type of disposable applanation tonometer and its container according to the present invention;

FIG. 2 is an enlarged view of a tonometer having twin shafts with two removable and discardable end plates;

FIG. 3 is an elevational view partly in section of a new tonometer according to the present invention having only a single shaft and end plate;

FIG. 4 shows magnets fitted in the end portion of the shafts and magnets also fitted in the end plates to provide a firm, secure fitting;

FIG. 5 shows the tonometer of FIG. 1 being utilized to measure intraocular pressure;

FIG. 6 shows an enlarged, exploded view of a deluxe version of a single ended tonometer;

FIG. 7 is an enlarged section of the tonometer of FIG. 6;

FIG. 8 shows the deluxe tonometer of FIG. 6 in assembled form ready to receive a fresh end plate;

FIG. 9 shows a shaft with an end plate thereon being brought into contact with a material containing a stain which material is contained within a cup for conveniently applying the stain to the end of the end plate which comes in contact with the eye to be measured;

FIG. 10 shows the tonometer of FIG. 2 with a paper enclosure;

FIG. 11 shows a container having a removable cap in which a multiplicity of end plates may be stored which keeps the end plates clean and sterile until they are ready for use at which time they can be placed on the shaft as indicated without the necessity for handling them;

FIG. 12 shows a strip sealing arrangement whereby the end plates are individually contained in a unit type seal with a peelable, perforated strippnig which allows a single end plate to be uncovered at a time and to be placed on the end of the shaft without the necessity of being handled.

The double ended applanation tonometer of FIG. 1 comprises a central hub portion 10 which is enlarged and which is in approximately the center of a shaft thus dividing the shaft into two shafts 11 of substantially equal length. Shafts 11 taper from hub 10 to its ends and is fitted at each end into a removable, disposable and replaceable end plate 12. The applanation tonometer is conveniently utilized by placing it within a container 13 having an open end portion 14 of diameter narrower than the diameter of hub portion 10 and at the other end having an open portion 15 the diameter of which is reduced by placing therein a closure member 16 having an opening 16a which is of lesser diameter than that of hub portion 10. When held in either an upward or a downward position the container is sized such that the tonometer within the container will slide downward and be prevented from coming out of the container by hub 10. The tapered portion of cylindrical shafts 11 enables the user to grasp the tonometer more easily and facilitates accurate placement of the removable and disposable end plates directly on the eye of a patient. The tonometer including the end plates may be made in any desired weight and the most useful weights are generally 5 grams, 7.5 grams and 10 grams. However, if desired, the entire tonometer can be made in any suitable weight. The tonometer and the enclosure may be made of any commercially available material such as plastic, metal alloys, paper or the like and the only requirement is that the material out of which the tonometer and enclosure are constructed should be sufficiently solid to avoid crumbling. It it is desired to sterilize the tonometer minus the end plates, then the tonometer material should be capable of withstanding sterilizing conditions. The end plates should be made out of a material which is sufficiently inexpensive to produce in quantity since the end plates will be discarded after use and thus only one eye will come in contact with any one end plate. A particularly suitable material for the tonometer including the ends, and the enclosure, is plastic.

The removcable and discardable end plates 12 can be fitted on to the end portion of shafts 11 by any suitable means such as a push-on fitting as shown in FIG. 1, a sleeve arrangement shown in FIGS. 2, 3, 6–10, or a magnetic sleeve attachment as shown in FIG. 4. The essential requirement of the present invention is that the end plates 12 be capable of being quickly removed, discarded and replaced by clean end plates without undue handling of the end plate prior to use so as to avoid contamination. For this purpose the end plates may be stacked within a suitable enclosure as shown in FIG. 11 or sealed in units as shown in FIG. 12.

FIG. 2 shows a particularly preferred embodiment of the tonometer of the present application wherein shafts 17 are tapered without any special end portions such as 11a in FIG. 1. The lower and upper portions of shafts 17 fit directly into sleeves 18a which are integral with end plates 18. This provides a particularly tight and secure fit. FIG. 4 has the added feature of small magnets being securely embedded in the ends of shafts 17 and in end plates 18. These magnets are indicated as 20 and 21 respectively. It is to be appreciated that this magnetic fit is equally applicable to the structure shown in FIG. 1.

Because the end plates 12 are easily removable and discardable it may be deemed convenient to produce the tonometer of the present invention as shown in FIG. 3, that is having only a single shaft portion 17 extending downward from hub 10' and onto which a removable and disposable end plate 18 is suitably attached. The tonometer of FIG. 3 is similar to either half of the tonometer of FIG. 1. The enclosure in FIG. 3 has a closed end 19 rather than the open end 14 of FIG. 1.

If desired the tonometer of the present invention may be made in a deluxe model which may be either single or double ended. For illustrative purposes a single ended deluxe model is shown in FIGS. 6 through 8. This embodiment comprises a two part enclosure namely, upper portion 22 and a lower portion 23 having an opening 23a through which the shaft 24 extends. Shaft 24 has a hub portion 25 which is of a larger diameter than openning 23a. Lower portion 23 may be attached to upper portion 22 by any suitable means such as a push fit, a screw-in fit or any other suitably convenient construction. The upper portion 22 is shown as having a stop portion 22a which limits upward internal movement of shaft 24 when the tonometer is assembled. Stop portion 22a can comprise the bottom portion of 22 or it may be a downward extension as shown in FIGS 6 and 7. FIG. 9 shows a cup and pad arrangement comprising cup 26 having a moistened pad 27 therewithin. Cup 26 and pad 27 are similar to cup and pad 21 and 22 shown in FIG. 2 of our co-pending application Ser. No. 554,861. Pad 27 contains the staining material and the removable and disposable end plates 12 and 18 are placed within the cup onto the pad to receive a coating on the surface of the end plate which will come in contact with the eye whose pressure will be measured. A concentrated suspension of mild silver protein (N.F.) is a suitable dyestuff for staining but any staining material of any known or desired nature can be utilized as well. When the stained surface of the end plate 12 or 18 is placed in contact with the eye of the patient a pattern will be formed thereon which indicates the amount of intraocular pressure. In eyes having glaucoma or a higher intraocular pressure, an impression different from that of a so called normal eye will be imparted to the stained end plate. This imprint can in turn, be transferred onto moistened paper or other suitable permanent or semi-permanent recording device so that the person administering the test will have a record of the pattern from each of the patient's eyes. Our co-pending application Ser. No. 554,861 discusses the significance of the impression and the particular pattern and shows one possible method of measuring and recording the pattern. A suitable scale is shown in FIG. 7 in that case. Other suitable measuring devices can also be utilized in conjunction with the tonometer of the present invention. It will also be appreciated as indicated in that application that the staining material can be placed on the end plates 12 and 18 in manners other than by use of the cup and pad arrangement of FIG. 9 and that the stain should be kept moist.

FIG. 5 shows the tonometer of the present application being utilized in measuring the intraocular pressure of a patient's eye. As can be seen in FIG. 5 placement of the tonometer is facilitated by the tapered shaft which gives the measuring person unobstructed vision of the eyeball of the person to be tested and thereby facilitates accurate placement of the end plate on the cornea of the person to be tested.

FIG. 10 shows the tonometer of FIG. 2 with a paper enclosure so that the enclosure as well as the end plates are disposable. Thus the end plates 18 may be discarded as well as the enclosure comprising inner sleeve 28 and outer sleeve 29 so that only the remaining portion of the tonometer comprising hub 10' and shafts 17 need to be made of a material capable of withstanding the conditions of sterilization. This facilitates the production of a relatively inexpensive tonometer capable of mass usage.

FIG. 11 shows an enclosure 30 having a removable cap 31 which enclosure contains a multiplicity of end plates. These end plates may either be of the type shown in FIG. 1 namely, end plates 12 or of the type shown in the remaining figures and designated as end plates 18 having sleeves 18a. For illustration purposes end plates 18 having sleeves 18a are shown. These end plates are stacked one on top of the other and the opening in the enclosure 30 is of sufficient diameter such that shaft 17 may be pushed into the open area and be fitted into the sleeve 18a and be removed having an end plate 18 securely attached to its end. This arrangement not only keeps the end plates 18 in a clean and sterile condition but also eliminates any necessity to handle end plates 18 which would result in their contamination. After the end plate has completed its function of measuring intraocular pressure it can be removed by hand and discarded and a fresh end plate can be attached.

FIG. 12 shows another possible arrangement whereby end plates such as 12 or 18 can be individually sealed to keep them clean, fresh and sterile. In FIG. 12 a strip sealing arrangement is shown with a tongue 33 which can be peeled backward to expose an end plate which can then be attached to the end of shafts 17 as indicated in the discussion of FIG. 11. Since only one end plate is uncovered at a time the remaining end plates remain in a clean, sterile condition and the perforations 35 enable the remaining compartments 34 each containing an end plate to remain sealed. It will be appreciated that other types of arrangements for maintaining the end plates in a clean and sterile condition can be used and other variations and modifications of the tonometer of this application will be appreciated by those skilled in the art.

What is claimed is:

1. In combination, a disposable applanation tonometer comprising a hub portion, at least one axially aligned shaft extending therefrom, said at least one shaft being tapered at its distal end and a removable and disposable end plate constructed to be affixed to each said at least one shaft at its tapered portion, said hub portion, said at least one shaft and each associated end plate being of fixed known weight, and a cylindrical container within which the tonometer is adapted to be received and within which it is longitudinally movable in opposite directions to exposed each removable and disposable end plate affixed to the at least one shaft, said container having limiting means at each end thereof to prevent unintentional disassembly of the tonometer and its container while still permitting free longitudinal movement of the tonometer within the container.

2. In combination, a disposable applanation tonometer comprising a hub portion, an axially aligned shaft extending downward therefrom and a removable and disposable end plate constructed to be affixed to the shaft at its distal end, said hub portion, said shaft and said end plate being of fixed known weight, and a cylindrical container closed at one end and having end closure means having an aperture therethrough attached to the other end, within which container the tonometer is adapted to be received and within which it is longitudinally movable in a downward direction to expose the removable and disposable end plate of the tonometer through the aperture, whereby said removable and disposable end plate is exposed at all times.

3. A disposable applanation tonometer comprising a hub portion and at least one axially aligned shaft extending therefrom, said at least one shaft having a tapered end portion, at least one removable and disposable end plate having a substantially smooth, flat surface on one side and a surface which includes an upwardly extending sleeve on the other surface constructed to fit over the tapered end portion of said at least one shaft, said at least one shaft and said at least one end plate being of fixed known weight.

4. A disposable applanation tonometer comprising a hub portion, an axially aligned shaft extending downward therefrom and a second axially aligned shaft extending upward therefrom, each of said shafts being tapered at the end portion thereof, a removable and disposable end plate constructed to be affixed to each shaft, said hub portion, said shafts and end plates being of fixed known weight.

5. A diagnostic method for measuring the intraocular pressure in determining the existence of glaucoma or insipient glaucoma in a human eye using an applanation tonometer with removable and disposable end plates which comprises applying a film of staining material to an end plate of said tonometer bringing said end plate into contact with the cornea of an eye, resting the end plate momentarily on the cornea in such manner that only the weight of the tonometer itself rests momentarily on the cornea, transferring the pattern so formed on the end plate to transfer papers, measuring the characteristics of said pattern with reference to a scale from which can be determined the intraocular pressure of the tested eye, removing the end plate on which the pattern was formed from the tonometer body and removably affixing an uncontaminated end plate to said tonometer body whereby the tonometer is readied for subsequent use.

References Cited

UNITED STATES PATENTS

| 3,330,152 | 7/1967 | Mackay | 73—80 |
| 3,338,090 | 8/1967 | Coombs et al. | 73—80 |
| 1,743,461 | 1/1930 | LaForce | 73—80 |
| 3,282,090 | 11/1966 | Posner et al. | 73—80 |

RICHARD C. QUEISSER, Primary Examiner

E. J. KOCH, Assistant Examiner